United States Patent [19]
Leupold

[11] Patent Number: 6,084,491
[45] Date of Patent: Jul. 4, 2000

[54] PERMANENT MAGNETIC RELUCTOR STRUCTURES AND METHODS

[75] Inventor: Herbert A. Leupold, Eatontown, N.J.

[73] Assignee: The United States of America as represented by the Secretary of the Army, Washington, D.C.

[21] Appl. No.: 09/262,752

[22] Filed: Mar. 4, 1999

Related U.S. Application Data

[62] Division of application No. 08/518,873, Aug. 24, 1995, Pat. No. 5,949,316.

[51] Int. Cl.$^7$ ........................................................ H01F 1/00
[52] U.S. Cl. ........................... 335/216; 335/296; 335/301; 335/304; 335/306; 505/211
[58] Field of Search ............................ 335/216, 296, 335/297, 298, 301–306; 310/90.5; 505/211, 879

[56] References Cited

U.S. PATENT DOCUMENTS

| | | | |
|---|---|---|---|
| 3,768,054 | 10/1973 | Neugebauer | 335/304 |
| 3,781,736 | 12/1973 | Parker | 335/304 |

*Primary Examiner*—Lincoln Donovan
*Assistant Examiner*—Raymond Barrera
*Attorney, Agent, or Firm*—Michael Zelenka; George B. Tereschuk

[57] ABSTRACT

In the preferred embodiment, a variable magnetic reluctor structure comprising an iron yoke having two opposing "U"-shaped bodies, magnetic flux sources formed by portions of the yoke, a magnetic flux path, a working space and a reluctor space is provided. A reluctor member comprising diamagnetic disks is inserted within the reluctor space decreasing the magnetic permeability of the magnetic flux path to a value lesser than that of air (1.0). The iron disks increase permeability, while either a Type I or a Type II superconducting disk or a combination of iron disks interspersed between Type II superconducting disks decreases permeability. Reluctor members comprising disks constructed solely of either iron, a Type I superconducting material, a Type II superconducting material, or a diamagnetic material, can be mounted in a rotating arrangement so that a different reluctor member can be mechanically inserted within the reluctor space resulting in increases or decreases to the magnetic permeability of the magnetic flux path to a value greater than that of air (1.0). In other embodiments of this invention, a permanent magnetic reluctor structure comprising a horseshoe-shaped magnetic flux source and two reluctor members comprised of stacked superconducting baffles, as well as structures utilizing thermal controls on permeability of reluctor members of a variable magnetic reluctor structure are provided. Methods of varying permeance are also shown.

12 Claims, 9 Drawing Sheets

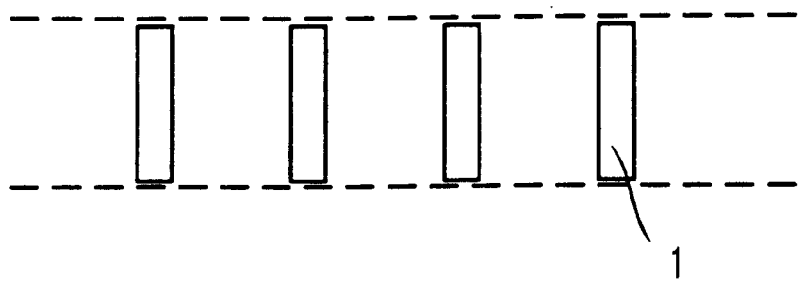
FIG. 1
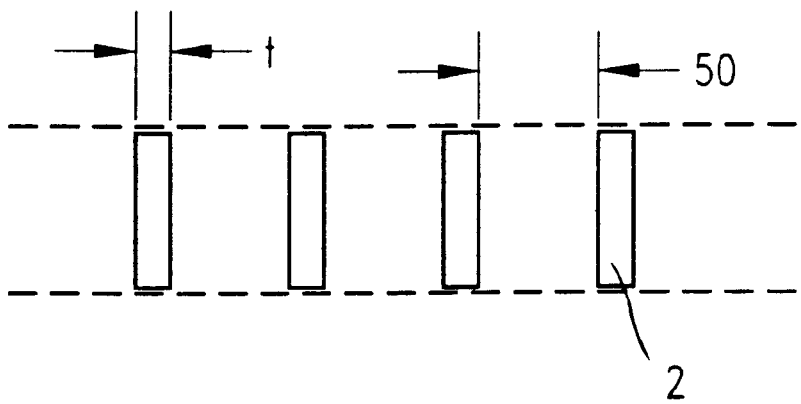
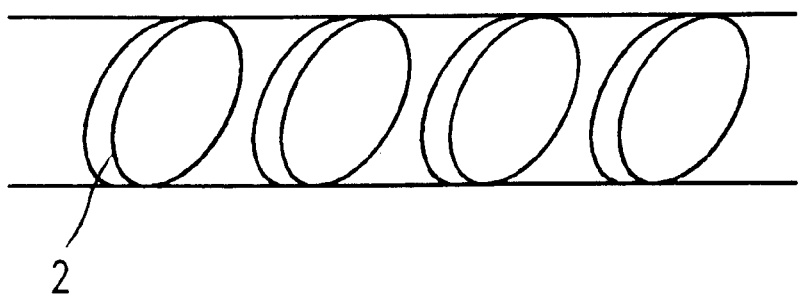
FIG. 2

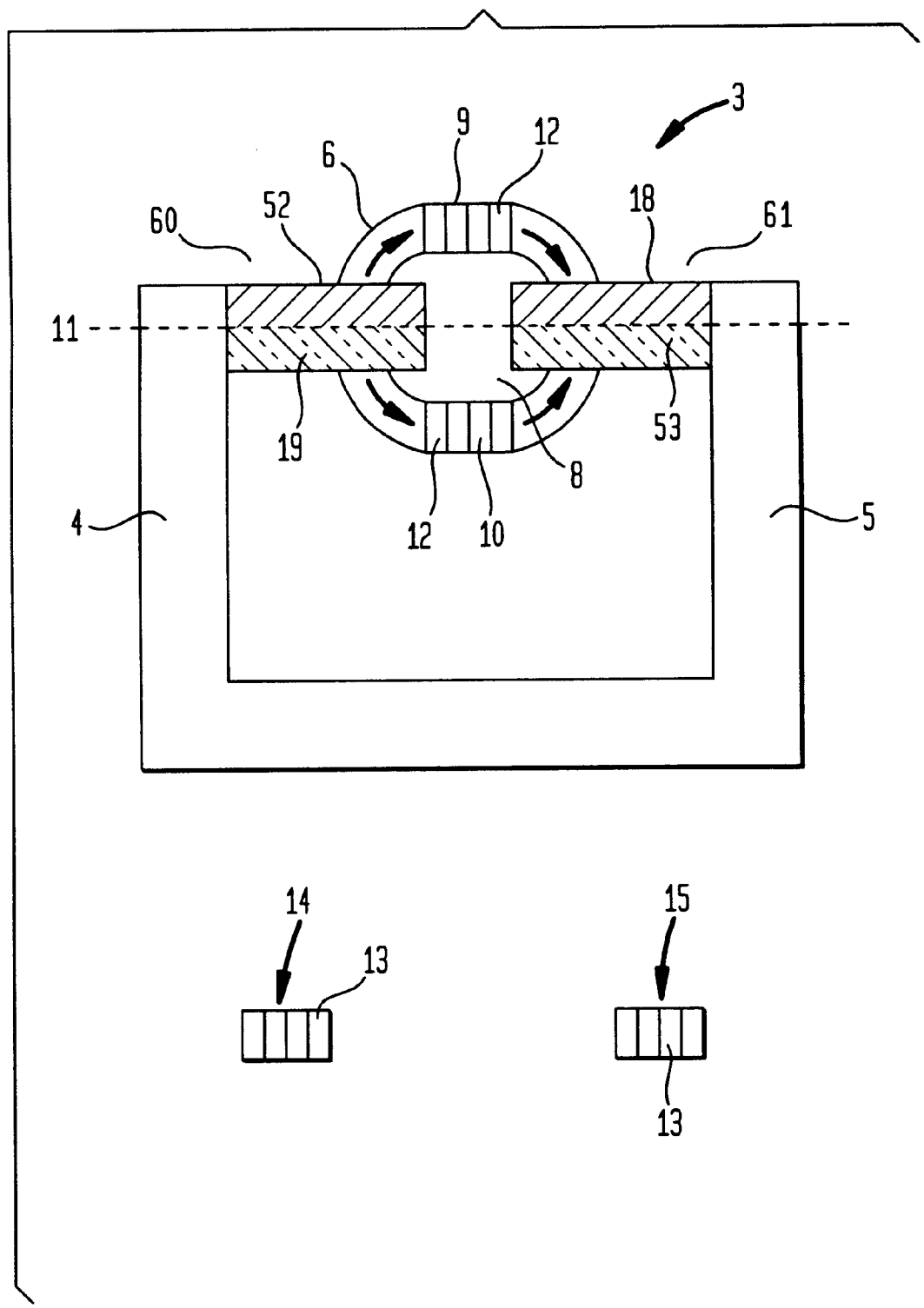

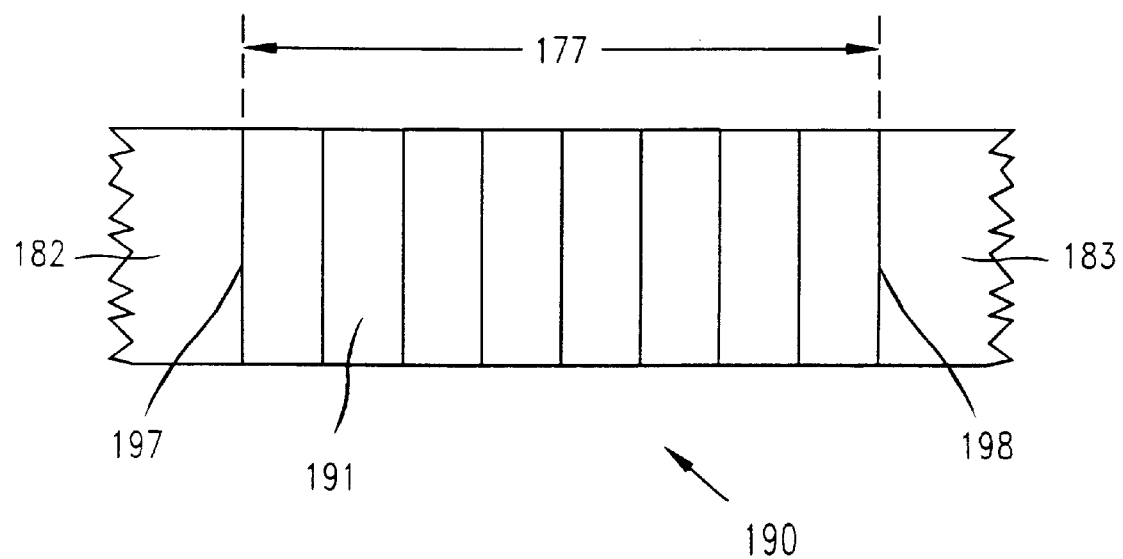
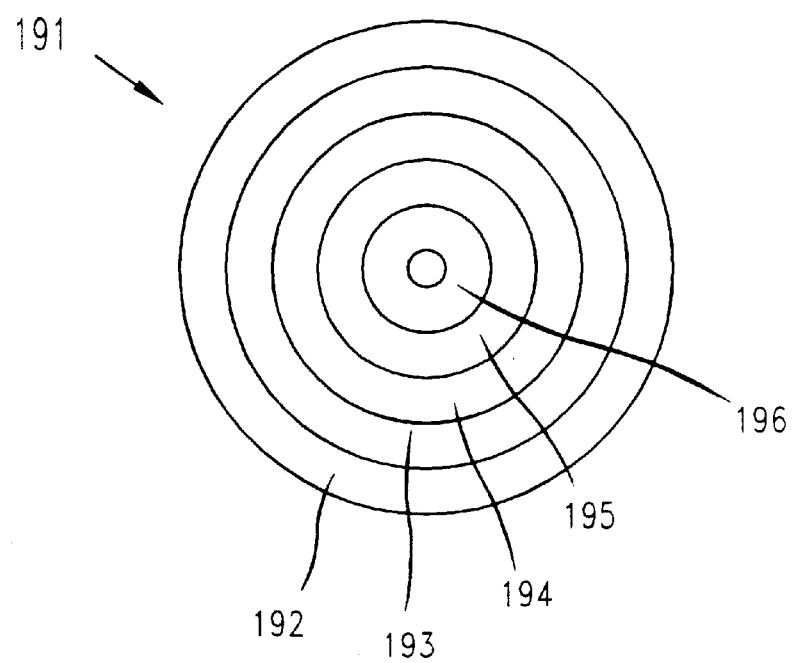
FIG. 7B

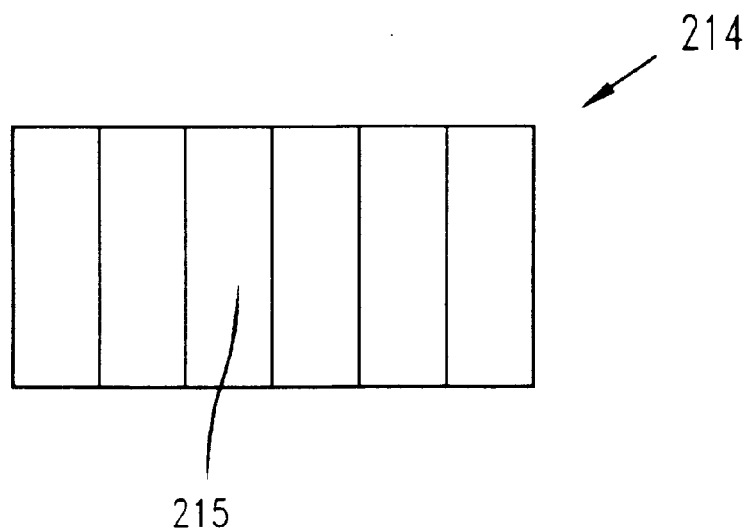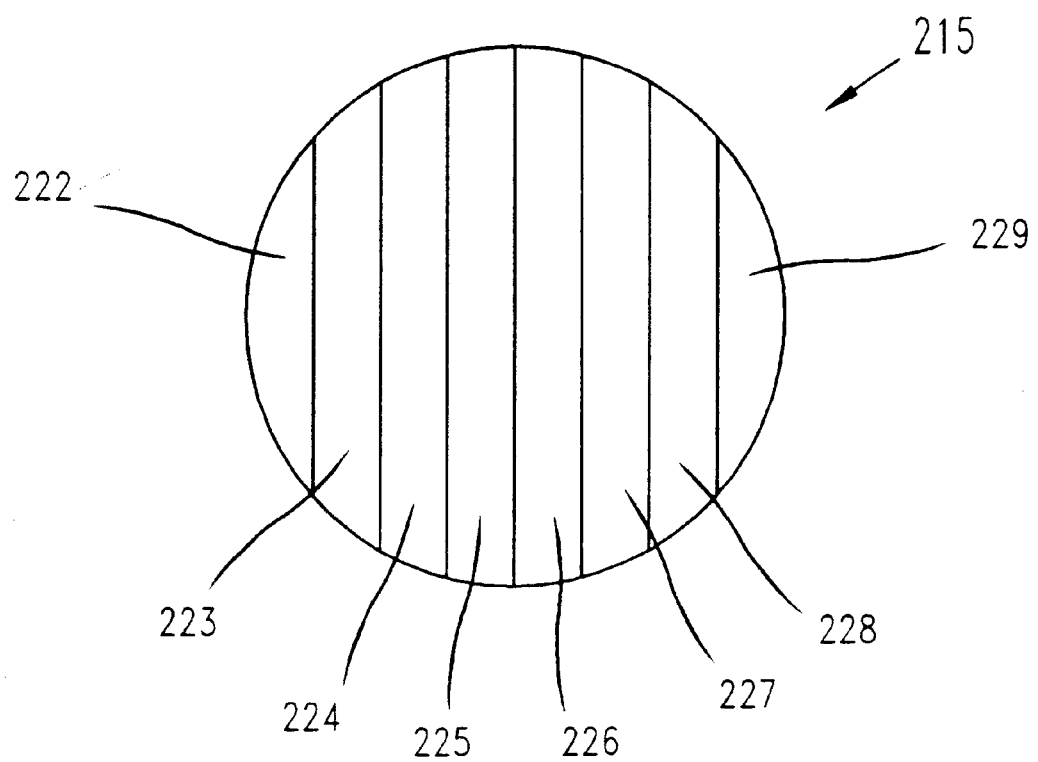
FIG. 8

PERMANENT MAGNETIC RELUCTOR STRUCTURES AND METHODS

DIVISIONAL APPLICATION

This application is a divisional application of U.S. patent application Ser. No. 08/518,873, now U.S. Pat. No. 5,949,316, with the same title which was filed on Aug. 24, 1995 by the inventor herein, and in which the Examiner has stated that those claims are in the condition for allowance. This divisional application is being filed under 35 USC §120 and 37 CFR §1.53, and priority from that application is hereby claimed.

GOVERNMENT INTEREST

The invention described herein may be manufactured, used and licensed by or for the Government of the United States of America without the payment to us of any royalties thereon.

BACKGROUND OF THE INVENTION

1. Field of the Invention

This invention relates to Permanent Magnetic Devices. More particularly, this invention relates to structures for producing magnetic flux paths with permeability greater or lesser than that of air (1.0), to magnetic circuit design, to attaining variable magnetic reluctivity and the adjustment of a magnetic field's permeance by both mechanical and temperature control means.

2. Description of the Prior Art

There are a number of technological fields in which it is desirable to have magnetic circuits designed which fix or vary the amount of reluctivity or permeability in such circuits, and consequently control the leakage of magnetic flux. It is well defined in the magnetic arts that permeance and reluctivity have an inverse relationship based on the formula $P=1/R$. Reluctance is defined as the opposition that material offers to magnetic lines of force, while permeance is defined as the ease with which magnetic lines of force distribute themselves within a material.

The current demand for compact, strong, static magnetic field sources that require no electric power supplies has created needs for permanent magnet structures of unusual form. There has been increasing interest in applications using permanent magnet structures. A number of configurations have been designed and developed for electron beam guidance in mm/microwave tubes of various types: for dc biasing fields in millimeter wave filters, circulators, isolators, strip-lines, for field sources in nuclear magnetic resonance imagers, extended interaction amplifiers, klystrons, travelling wave tubes, magnetrons and so on.

Many devices that employ magnetic fields have heretofore been designed where magnetic flux leakage is reduced or eliminated by employing one or more cladding magnets to confine the magnetic flux to the working space. Similarly, longitudinal magnets have been combined or aligned in such a way that the leakage of magnetic flux is reduced or eliminated. See for example, Leupold, et. al. "A Catalogue of Novel Permanent-Magnet Field Sources" Paper No. W3.2 at the 9th International Workshop on Rare-Earth Magnets and Their Applications, Bad Soden, Federal Republic of Germany, Aug. 31–Sep. 2, 1987. Further, adjustable magnetic fields have a great number of practical uses and have been known for some time in the permanent magnet arts. See for example Leupold, U.S. Pat. No. 4,837,542, entitled "Hollow Substantially Hemispherical Permanent Magnet High-Field Flux Source for Producing a Uniform High Field"; Leupold, U.S. Pat. No. 4,862,128 entitled "Field Adjustable Transverse Flux Sources"; Leupold, U.S. Pat. No. 4,994,778 entitled "Adjustable Twister"; Leupold, U.S. Pat. No. 5,113,163 entitled "Adjustable Magnetic Field Superconducting Solenoid" and Leupold, U.S. Pat. No. 5,216,400, entitled "Magnetic Field Sources for Producing High-Intensity Variable Fields."

Those concerned with the development of such systems have long recognized the need for magnetic structures capable of controlling the delivery of magnetic flux from a magnetic flux source to a load.

Unlike electrical circuits, magnetic flux flow paths are not confined to tractable paths such as electrical wires. Magnetic flux lines tend to fill all space in their proximity, however it is possible to bunch or manipulate a magnetic flux path by utilizing iron magnetic circuit elements which have zero reluctance. In magnetic circuits, the greatest reluctivity is generally that of air wherein permeability, or $\mu$, equals 1.0. Ordinarily, flux paths have permeabilities of either $\infty$, infinity, as in the case of iron, or 1.0, in the case of air or rigid permanent magnets, with occasional values between 1.0 and $\infty$, in the case of non-rigid permanent magnets and paramagnets. Between air and iron are a number of paramagnets with a permeability between 1.0 and $\infty$, and these paramagnets can act as intermediate reluctors that will increase the magnetic circuit's permeability to values higher than that of air. Inserting such a reluctor results in the surrounding airspace furnishing a magnetic flux path in parallel with the inserted object. For permeability values between 1.0 and 0, the medium must be diamagnetic. The only known diamagnets of appreciable strength are the superconductors, and for values of permeability between 0 and 1.0, only some of the Type II superconductors perform adequately.

Thus, choice of materials and their alignment or manipulation within the magnetic circuit allows adjustment of the total permeance of the magnetic circuit. The first reluctor structure disclosed herein produces a more or less constant reluctance for the given structure by alignment of a plurality of baffled reluctor members within the structure's magnetic flux flow path. Often, however, applications require that the magnetic field be adjusted through a range of values making it desirable to create magnetic fields that can be readily adjusted with continuous variation of permeance from 0 to 1.0 (air). The present invention fulfills this need by also providing a reluctor member that can be placed within a structure's flux path so that permeability can be readily adjusted, either by alignment of the reluctor member or insertion by mechanical means. Providing a permanent magnetic structure of this type allows fixing or varying the permeability of the flux path and thus the characteristics of the flux being produced. The reluctor member can comprise stacked pieces, or disks, constructed of iron, a superconducting material, or a combination of iron, superconductors and magnetic material. Additionally, this invention provides for attaining variable permeance by employing thermal controls with reluctor member pieces, or disks, composed of either concentric annular rings or parallel strips constructed of superconducting elements with different transition temperatures. The present invention also provides for methods of adjusting or varying magnetic permeability.

SUMMARY OF THE INVENTION

It is therefore a primary object of this invention to provide a permanent magnet structure wherein the magnetic flux paths can have magnetic permeability different from that of air (1.0).

It is a further object of this invention to provide permanent magnet structures having a plurality of reluctor members allowing fixed and variable magnetic permeability of less than air (1.0) for the magnetic flux paths of the structure.

Another object of this invention is to provide for permanent magnet structures having a plurality of reluctor members so constructed and aligned within the magnetic flux path to afford variable magnetic permeability different from that of air (1.0) for the magnetic flux paths of the structure.

It is still a further object of this invention is to provide for varying the permeability and reluctance of a permanent magnetic structure having magnetic permeability different than that of air (1.0) for the magnetic flux paths of the structure based upon the transition temperature of the reluctor member placed within the magnetic circuit.

An additional object of this invention is to provide for methods for varying magnetic permeability different from that of air (1.0) by advantageously forming and aligning a plurality of reluctor members in proximity to a magnetic flux path.

These and other objects are achieved in accordance with several embodiments of this invention, by the advantageous configuration of selected materials in a plurality of reluctor members that are aligned or manipulated within the flux path of the magnetic circuit, thereby allowing the contemplated adjustment of the total permeance of the magnetic circuit.

The present invention comprises a permanent magnetic reluctor structure having a plurality of pieces such as disks aligned within a reluctor member in proximity to a magnetic flux source, a magnetic flux path and a space of the magnetic structure resulting in either an increase or decrease of the magnetic permeance of the structure, with a consequential decrease or increase in reluctance. The plurality of pieces or disks within the reluctor member are characterized by their ability to alter the permeability and reluctance of the magnetic structure, and can be substituted with another shape.

In general, the present invention is a permanent magnetic reluctor structure having a supply magnet acting as a magnetic flux source, a plurality of magnetic flux paths, a plurality of working spaces and a given magnetic permeance. A plurality of pieces such as disks are aligned within a plurality of reluctor members in proximity to the magnetic flux paths and working spaces. The composition of the pieces of the reluctor members along with the positioning of the reluctor members in proximity to the magnetic flux paths and working spaces varies the flux path's permeance so that its permeance is higher or lower, depending upon the composition of the reluctor member, than the permeance of air (1.0).

Thus, in the first embodiment of this invention, a permanent magnetic reluctor structure comprising a horseshoe-shaped magnetic flux source, a longitudinal axis running through the flux source, a plurality of magnetic flux paths and a working space are provided along with two reluctor members comprised of stacked superconducting or iron baffles. The reluctor members are coaxially aligned within the magnetic flux paths and in proximity to the working space enhancing the impedance and reluction of the flux paths thereby reducing the magnetic permeability of the flux paths to a fixed value below that of air (1.0).

In the preferred embodiment, a variable magnetic reluctor structure is provided comprising an iron yoke having two opposing "U"-shaped bodies with the same dimensions, magnetic flux sources formed by portions of the yoke, a magnetic flux path, a working space and a reluctor space. A reluctor member comprising a plurality of diamagnetic pieces is inserted within the reluctor space decreasing the magnetic permeability of the magnetic flux path to a value lesser than that of air (1.0). In this embodiment, the pieces are constructed of either iron to increase permeability, a Type I superconducting material to decrease permeability to a value lesser than air (1.0) but greater than 0, a Type II superconducting material to decrease permeability to a value lesser than air (1.0) but greater than 0, or a combination of iron pieces interspersed between Type II superconducting pieces to adjust permeability to a predetermined value. The pieces may be disks or disk-shaped. A variation of the variable magnetic reluctor structure of the preferred embodiment encompasses a plurality of reluctor members comprising pieces constructed solely of either iron, a Type I superconducting material, a Type II superconducting material, a diamagnetic material or a paramagnetic material, which are mounted on a rotating means so that a different reluctor member can be mechanically inserted within the reluctor space resulting in increases or decreases to the magnetic permeability of the magnetic flux path to a value greater than that of air (1.0) or a value lesser than air (1.0) but greater than 0, depending upon the composition of the reluctor member as described above in this specification. The reluctor member pieces may be disks, disk-shaped or also be in shapes other than a disk.

In the third embodiment, thermal controls on permeability of reluctor members of a variable magnetic reluctor structure are employed, by providing an iron yoke comprising two opposing "U"-shaped bodies with the same dimensions, magnetic flux sources being formed by a portion of the yoke, a magnetic flux path, a working space and a reluctor space, along with a reluctor member. In this embodiment, thermal controls on permeability which attain thermally variable permeance are provided in three ways. The third embodiment provides a reluctor member comprising a plurality of concentric annular disks constructed solely either of iron, a Type I superconducting material, a Type II superconducting material and a diamagnetic material, with each concentric annular disk having a specific transition temperature. A variation of the third embodiment, utilizing the same basic configuration, provides a reluctor member, having disks formed from parallel panels or strips each having a specific transition temperature, with the disks being constructed of iron, a Type I superconducting material, a Type II superconducting material and a diamagnetic material. The third type of thermal control establishes the temperature of the reluctor member before insertion into the reluctor space by utilizing a heating means, a cooling means, or a combined heating and cooling means. Some variations in shape of the reluctor member components may be utilized here as well. Methods for adjusting magnetic permeance are also disclosed.

In order to address the long-felt need for adjusting magnetic permeance and reluctance, these embodiments provide for stacking pieces of various compositions in order to construct a magnetic reluctor structure with an effective permeability ($\mu$) value.

It is an advantageous feature of the present invention that a plurality of pieces such as disk and disk-like structures of several types of materials can be inserted within a space in the structures of any of the contemplated embodiments in order to either fix or vary the magnetic permeability of the structure to several different values. The variability thus provided is significant because of the numerous potential applications for varying permeance in magnetic circuits such as in electron tubes, filters, circulators and so on.

The terms "permeance" or "permeability" as used throughout this specification should be considered to refer respectively to the ratio of flux carried by a magnetic element to the magneto-motive force across it, and to the ratio of the flux density to magnetic field.

The terms "reluctance" and "resistivity" as used throughout this specification should be considered to refer to the respective reciprocals of "permeance" and "permeability."

The term "Type I superconducting material" as used throughout this specification should be considered to refer to a material that completely excludes magnetic flux from its interior.

The term "Type II superconducting material" as used throughout this specification should be considered to refer to a material that only partially excludes flux above a certain critical field $H_{c1}$ but acts as a Type I superconducting material below $H_{c1}$. Above a second critical field $H_{c2}$ superconductivity vanishes and flux penetration is complete.

These definitions should apply in conjunction with any other commonly accepted definitions of those terms.

The exact nature of this invention as well as other objects and advantages thereof will be readily apparent from consideration of the following specification relating to the annexed drawings.

BRIEF DESCRIPTION OF THE DRAWINGS

FIG. 1 is a perspective view of a plurality of iron baffles.

FIG. 2 is a side and a perspective view of a plurality of Type II superconducting baffles.

FIG. 4 is a side view of the first embodiment of the invention.

FIG. 7B shows an exploded side view and a cross-sectional view of the reluctor member of the third embodiment of the invention comprising a plurality of annular rings.

FIG. 8 shows an exploded side view and a cross-sectional view, respectively, of the reluctor member of a variation of the third embodiment of the invention comprising a plurality of disks constructed of parallel strips or panels.

DETAILED DESCRIPTION OF THE DRAWINGS

Figure 3:
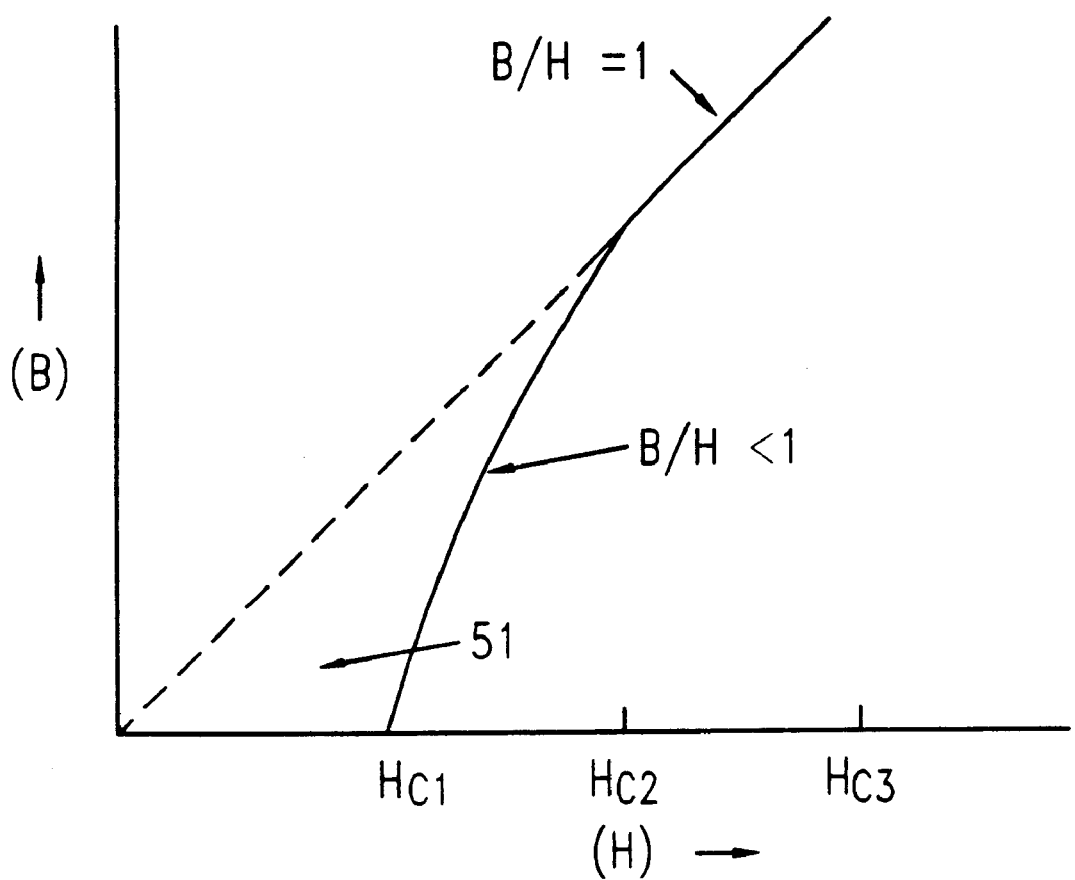
FIG. 3 is a graph useful in understanding the magnetization curve of the typical Type II superconductor indicating a useful region of magnetization.

Referring now to the drawings, there is shown in FIGS. 1 and 2, a plurality of annular iron baffles 1 and a plurality of Type II superconductor baffles 2, respectively. In the FIG. 2 drawing, each superconductor baffle 2 has a width t, and a space 50 denoted as l between each of said superconductor baffles 2, here showing three (3) spaces where there are four (4) superconductor baffles 2.

FIG. 3 is a graph depicting the magnetization curve of a typical Type II superconductor, wherein $H_{c1}$ is the lower critical field and $H_{c2}$ is the upper critical field, with B being the ratio of magnetic induction and H being the desired magnetic field. Ideally, permeance would be independent of H, the magnetizing force or desired magnetic field, but Type II superconductors are reactive materials, meaning that their state of magnetization responds to an imposition or change in external field. The FIG. 3 graph indicates a useful region of magnetization 51 falling between graph points $H_{c1}$ and $H_{c2}$, so that:

$$\frac{B}{H} = \mu < 1$$

with ranges varying from permeability, $\mu=0$ at point $H_{c1}$ to $\mu=1.0$ at point $H_{c2}$. In order to obtain the desired permeability value $\mu$ at the operating value of H in a device, a material with characteristics placing it within an appropriately shaped B/H curve can be chosen. If the gap is totally unfilled, permeance P would be:

$$P = \frac{A\mu}{l}$$

where l is the gap length and A is cross-sectional area:

$$A = \frac{\pi d^2}{4}$$

If the gap is completely filled with a diamagnet of $\mu=0.5$, the permeance would be:

$$P = \frac{\pi d^2 \mu}{4l}$$
$$= \frac{\pi d^2 (0.5)}{4l}$$
$$= \frac{\pi d^2}{8l}$$

which equals half of the permeance of the pure air gap so that Reluctance R:

$$R = \frac{1}{P} = \frac{8l}{\pi d^2}$$

Known Type II superconductors, such as the niobium based ones, for example, afford numerous desired B/H values within this useful region of said magnetization curve 51.

This relationship is expressed in the well-known formula:

$$P = \frac{\pi d^2 \mu}{4l} = \frac{\pi d^2 (0.5)}{\mu l} = \frac{\pi d^2}{2l}$$

FIG. 4 shows the first embodiment of this invention, a permanent magnetic reluctor structure, which comprises a horseshoe-shaped magnetic flux source 3 having an iron cylindrical left arm 4 and an iron cylindrical right arm 5, a magnetic flux path 6, a working space 8, a pair of permanent magnets 60 and 61, respectively, and a pair of reluctor members 9 and 10, respectively, having a plurality of superconducting baffles 12. Said pair of permanent magnets 60 and 61, respectively, have a common longitudinal axis 11 that intersects said working space 8. Said magnetic flux path, arrow 6, has given magnetic permeance and reluctance values and a circular magnetization orientation around said working space 8 with said magnetic flux path 6, emanating from an upper portion 52 of said permanent magnet 60 through said reluctor member 9 to an upper portion 18 of said permanent magnet 61. Said pair of reluctor members 9 and 10, respectively, are coaxially aligned with, and occupy the same space as, said magnetic flux path 6, which reduces the magnetic flux flow in said magnetic flux path 6 by the decrease of permeability there in said magnetic flux path 6, which increases magnetic potential across said working space 8, or gap, and results in increased magnetic flux in said working space 8. The composition of said plurality of superconducting baffles 12 along with the positioning of said reluctor members 9 and 10, respectively, within said magnetic flux path 6 and said working space 8, obtain a desired value of permeance, $\mu$, which is lower than the permeance of air (1.0) but greater than 0.

In this first embodiment, said Type II superconducting baffles 12 may be disk shaped. Replacing said Type II superconducting baffles 12 comprising said reluctor members 9 and 10 with a plurality of iron baffles 13 will form iron reluctor members 14 and 15, respectively. Aligning iron reluctor members 14 and 15 within magnetic flux path 6 in the same manner, decreases the magnetic permeability of the magnetic flux path 6 to a value below the permeance of air (1.0) but greater than 0. Said Type II superconducting baffles 12 must operate at temperatures below their transition temperatures and may be interspersed with air or empty space or other non-magnetic media (where $\mu$=1.0), irrespective of the transition temperature. The only known diamagnetics of appreciable strength are the Type II superconductors, when they operate at magnetic fields between $H_{c1}$ and $H_{c2}$, as depicted in FIG. 3. Suitable Type II superconductors are well known to those skilled in the magnetic arts or can be other Type II materials.

Figure 5A:
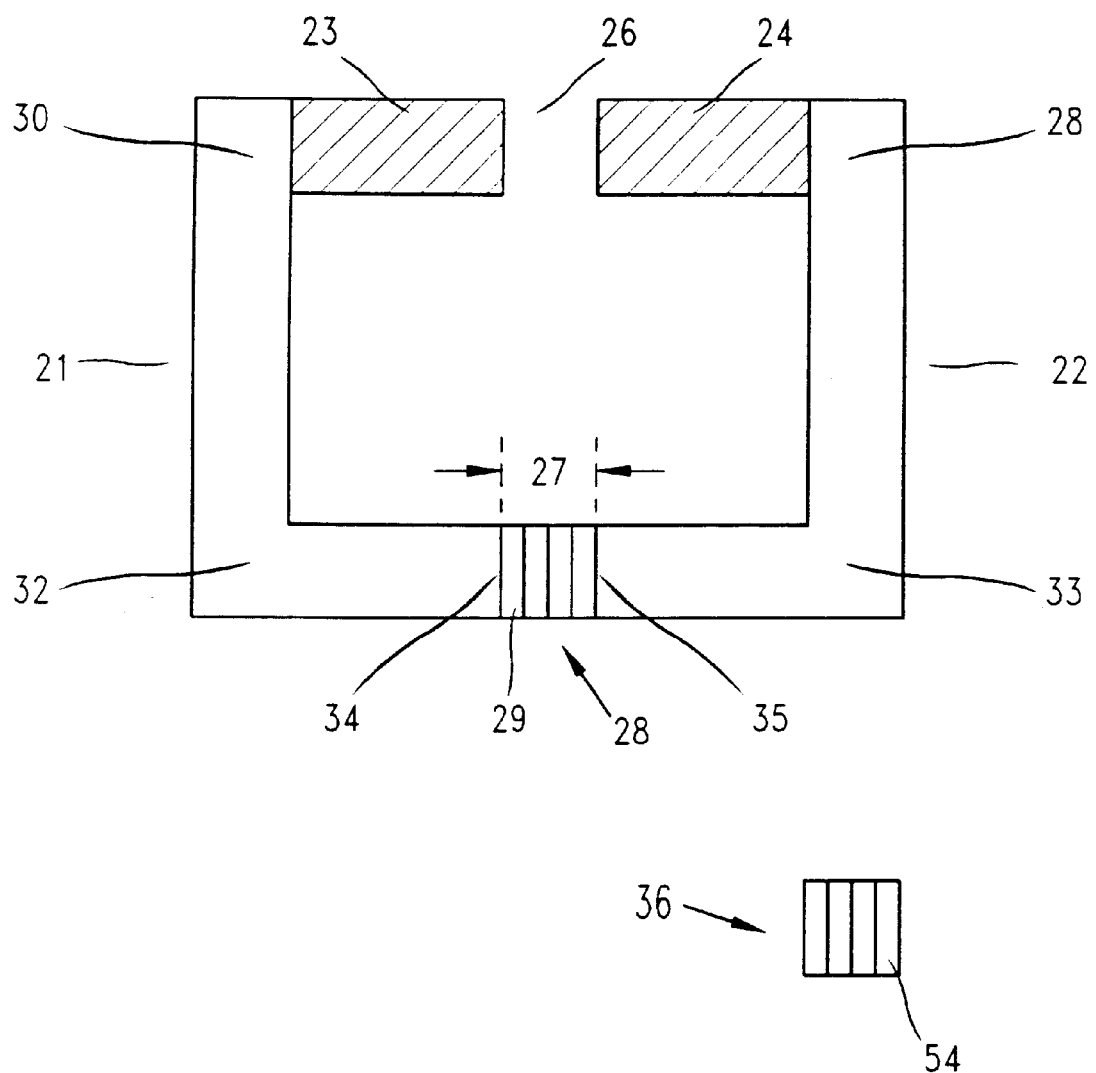
FIG. 5A is a side view of the preferred embodiment of the invention with a reluctor member comprising iron disks.

The preferred embodiment depicted in FIG. 5A is a variable magnetic reluctor structure comprising an iron yoke having two opposing "U"-shaped bodies 21 and 22, respectively, with a left upper arm 30 and a right upper arm 31 of said yoke joining magnetic flux sources 23 and 24, respectively, thereby providing a magnetic flux path, a pair of magnetic poles, a working space 26 and a reluctor space 27. Each of said opposing "U"-shaped bodies 21 and 22, respectively, having said left upper arm 30, said right upper arm 31, a left lower arm 32 and a right lower arm 33, respectively. A reluctor member 28, having a plurality of iron pieces 29, a left end 34 and a right end 35, is inserted within said reluctor space 27 with said left end 34 of the reluctor member 28 contacting said left lower arm 32 of one of said "U"-shaped bodies 21 and said right end 35 of the reluctor member 28 contacting said right lower arm 33 of said other "U"-shaped body 22. The alignment of said reluctor member 28 within said reluctor space 27 using said iron pieces 29 in this manner increases the magnetic permeability of said magnetic flux path to a value greater than that of air (1.0). However, when said iron pieces 29 comprising said reluctor member 28 are replaced by a plurality of Type II superconductor pieces 54 to form a Type II superconductor reluctor member 36 aligned within said reluctor space 27 in the same manner, the magnetic permeability of said magnetic flux path is decreased to a value lesser than that of air (1.0) but greater than 0.

Figure 5B:
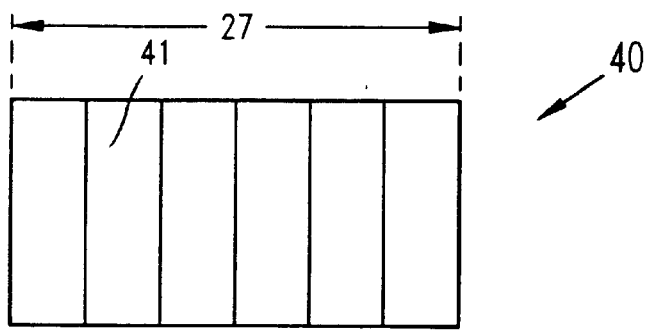
FIGS. 5B–5D are exploded side views of preferred embodiment variations of the invention comprising reluctor members of a Type I superconductor, a Type II superconductor and Type II superconductor disks interspersed with iron disks, respectively.
Figure 5C:
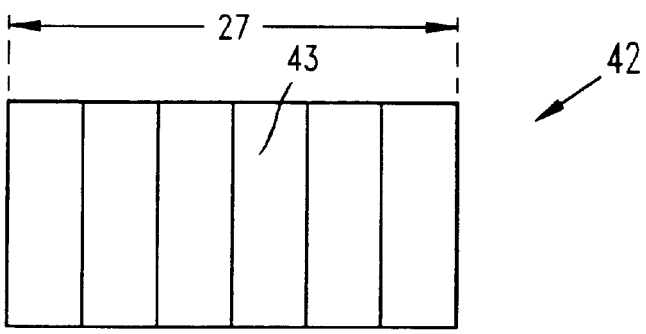
Figure 5D:
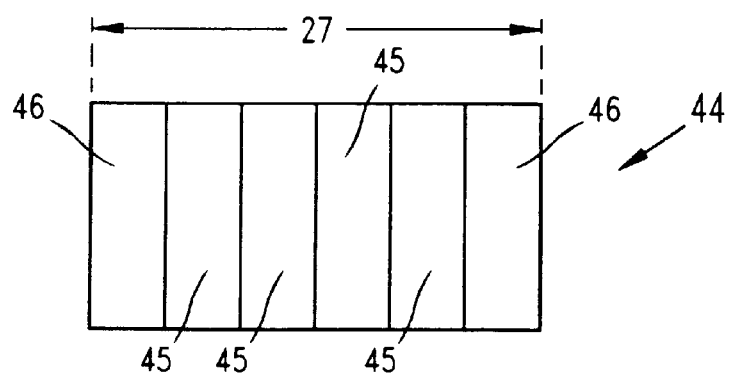
Figure 5E:
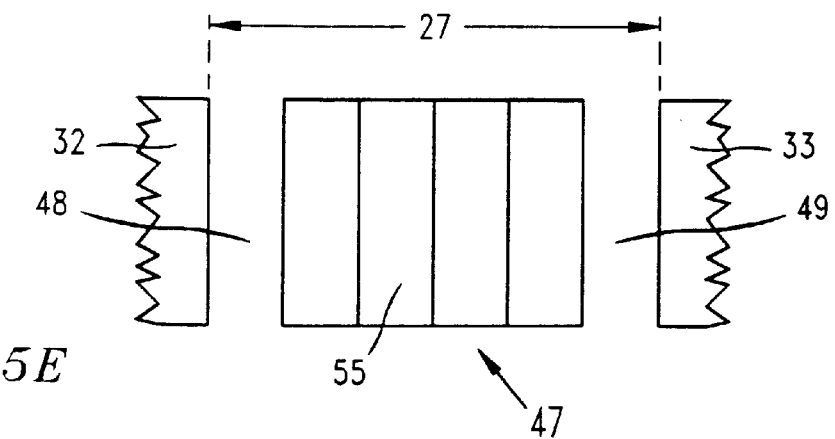
FIG. 5E is an exploded side view of a variation of the preferred embodiment of the invention comprising a plurality of Type II superconductor disks interposed between air gaps.

Similar operations and alignments are employed in variations of the variable magnetic reluctor structure of the preferred embodiment, utilizing the same configuration, depicted in FIGS. 5B–5E and 6. FIGS. 5B–5D are exploded side views of reluctor members of the preferred embodiment where reluctor members may comprise pieces of a Type I superconductor, a Type II superconductor and Type II superconductor pieces interspersed with iron pieces, respectively. Similarly, FIG. 5E is an exploded side view of a variation where a plurality of Type II superconductor pieces may be interposed between a pair of air gaps.

Each of these variations utilizes the same FIG. 5A iron yoke configuration, with a plurality of Type I superconductor pieces 41 comprising a Type I superconductor reluctor member 40 in FIG. 5B, a plurality of Type II superconductor pieces 43 comprising a Type II superconductor reluctor member 42 in FIG. 5C and a plurality of Type II superconductor pieces 45 interspersed with a plurality of iron pieces 46 in a reluctor member 44 in FIG. 5D, respectively, inserted within said reluctor space 27 and contacting said left lower arm 32 of one of said "U"-shaped bodies 21 and said right lower arm 33 of said other "U"-shaped body 22. The alignment of any of said plurality of reluctor members 40, 42, and 44, respectively, within said reluctor space 27 in this manner varies the magnetic permeability of said magnetic flux path to a value different than that of air (1.0), depending upon the composition of said pieces identified further below, comprising said plurality of reluctor members 40, 42, and 44, respectively. In this arrangement, said plurality of Type I superconductor pieces 41 in said Type I superconductor reluctor member 40 decreases permeability to a value lesser than that of air (1.0), but greater than 0, said plurality of Type II superconductor pieces 43 in said Type II superconductor reluctor member 42 decreases permeability to a value lesser than that of air (1.0), but greater than 0, and said plurality of Type II superconductor pieces 45 interspersed with said plurality of iron pieces 46 in said reluctor member 44 decreases permeability to a value lesser than that of air (1.0), but greater than 0.

Referring now specifically to FIG. 5E, this preferred embodiment variation differs from FIGS. 5A–5D variations, respectively, by disposing a reluctor member 47 comprising a plurality of Type II superconductor pieces 55 between a left gap 48 lying next to said lower arm 32 of said "U"-shaped body 21 and a right gap 49 lying next to said lower arm 33 of said other "U"-shaped body 22.

Figure 6:
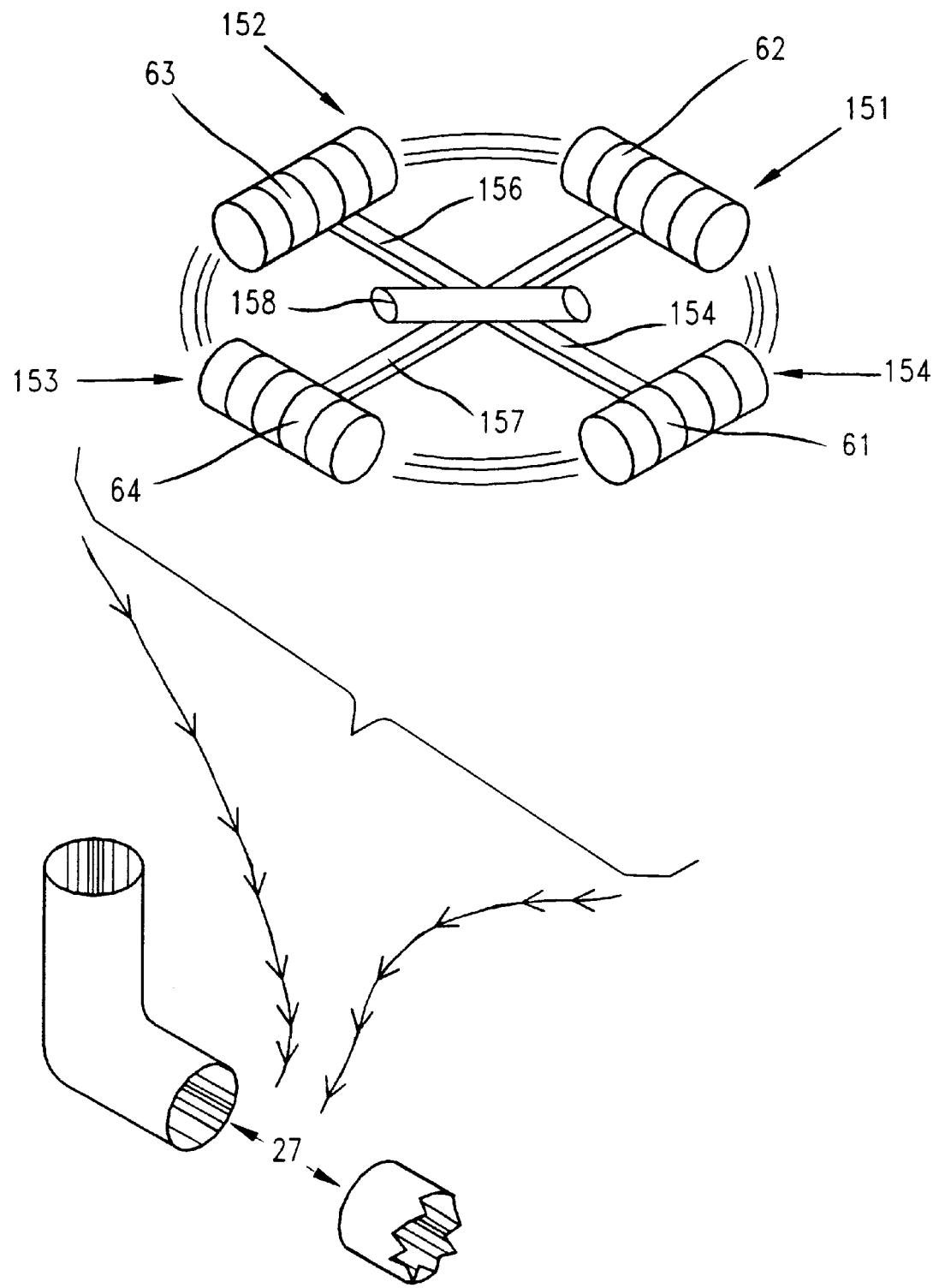
FIG. 6 is an exploded perspective view of a variation of the preferred embodiment of the invention with a plurality of reluctor members mounted on a rotating means.

FIG. 6 is an exploded perspective view illustrating another variation of the variable magnetic reluctor structure of the preferred embodiment comprising a means for rotating a plurality of reluctor members into the reluctor space utilizing the FIG. 5A iron yoke configuration, with a plurality of reluctor members 150, 151, 152 and 153, respectively, inserted within said reluctor space 27 and contacting said left lower arm 32 of one of said "U"-shaped bodies 21 and said right lower arm 33 of said other "U"-shaped body 22. Referring now to FIG. 6, each of said reluctor members 150, 151, 152 and 153, respectively, comprise a plurality of stacked iron pieces 61 in said reluctor member 150 to increase permeability to a value greater than air (1.0), a plurality of stacked Type I superconducting pieces 62 in said reluctor member 151 to decrease permeability to a value lesser than that of air (1.0) but greater than 0, a plurality of stacked Type II superconducting pieces 63 in said reluctor member 152 to decrease permeability to a value lesser than that of air (1.0) but greater than 0 and a plurality of stacked nonmagnetic pieces 64 in said reluctor member 153 to have a permeability value equivalent to that of air (1.0).

In FIG. 6, the arrows pointing downward indicate movement of any one of said plurality of reluctor members through said reluctor space 27. Each of said reluctor members 150, 151, 152 and 153, respectively, being attached to a connecting rod 154, 155, 156 and 157, respectively, each of said connecting rods 154, 155, 156 and 157, respectively, being connected to said rotating means 158 allowing each of said reluctor members 150, 151, 152 and 153, respectively, to be mechanically inserted within said reluctor space 27 and to contact said lower arms 32 and 33, respectively, of said "U"-shaped bodies when said rotating means 158 is engaged. In this variation of the preferred embodiment, said reluctor members 150, 151, 152 and 153, respectively, may comprise a plurality of stacked pieces constructed of other materials, depending upon the permeability effects desired.

In the preferred embodiment said left lower arm 32 and right lower arm 33 may either be cylindrically shaped, as illustrated in FIG. 4, square-shaped, in which case a greater number of magnetic flux paths would result, or any other suitable geometric shape, with a consequent change to the number of magnetic flux paths. Further, in the rotating means variation, a greater or lesser number of reluctor members may be advantageously employed, depending upon the permeability characteristics desired. Additionally, in the preferred embodiment of the present invention and each of its variations, the pieces which comprise the various reluctor members may be disks or disk-shaped.

The third embodiment of the present invention and its variations shown in FIGS. 7A–8B, respectively, all employ thermal controls on permeability to attain variable permeance, rather than variation of permeance by either alignment or mechanical insertion of a reluctor member. In a reluctance-free environment such as an iron yoke, alternate pieces, or disks, of superconductive material, iron or even an air gap can be inserted in a reluctor space within the structure according to the range of desired values within the working space. In the third embodiment, the fabrication of superconducting elements with different transition temperatures, the temperature variations can produce an almost continuous range of total reluctance values so that when the ambient temperature of the superconductor exceeds the transition temperature, the structure's permeability equals that of air (1.0), while ambient temperature below the transition temperature, where permeability is 0, cuts off the magnetic flux flow through that structure, leaving only flux flow around, rather than through, the structure, and thence through the air as space thins.

Figure 7A:
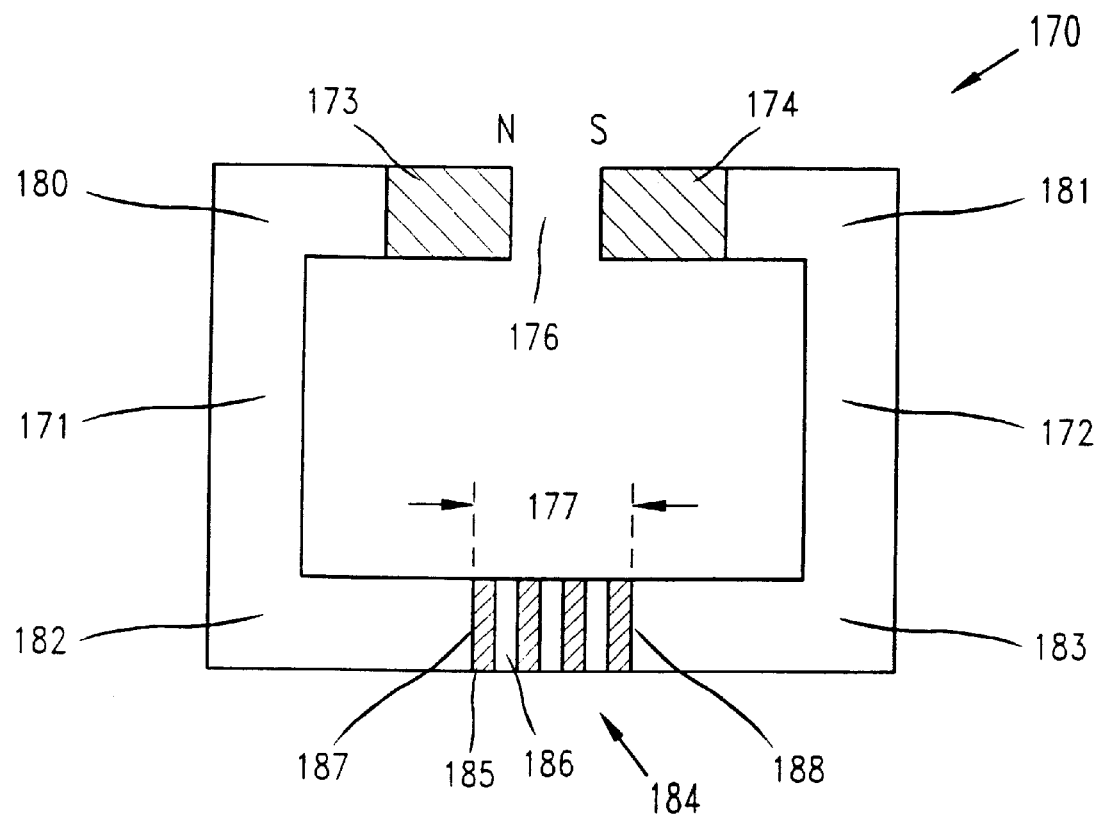
FIG. 7A is a side view of the third embodiment of the invention.

FIG. 7A depicts a side view of the third embodiment, that is similar to the preferred embodiment, except for the construction of the reluctor member, which is an iron yoke 170, having a reluctance-free magnetic environment, comprising two (2) opposing "U"-shaped bodies 171 and 172, respectively, with a portion of said iron yoke 170 forming magnetic flux sources 173 and 174, respectively, thereby providing a pair of magnetic poles, a magnetic flux path, a working space 176 and a reluctor space 177. Said opposing "U"-shaped bodies 171 and 172, respectively, each having an upper arm 180 and 181, respectively, and a lower arm 182 and 183, respectively.

A reluctor member 184 comprises an alternating plurality of stacked iron disks 185 and Type I superconductor disks 186, said reluctor member 184 having a left end 187 and a right end 188. Said Type I superconductor disks 186, having a transition temperature different from the ambient temperature. Said reluctor member 184 is inserted within said reluctor space 177 according to the range of desired values within said working space 176. In operation, said reluctor member 184, having a predetermined transition temperature by virtue of its composition, is inserted within said reluctor space 177, with said left end 187 of said reluctor member 184 contacting said lower arm 182 of said "U"-shaped body 171 and said right end 188 of said reluctor member 184 contacting said lower arm 183 of said other "U"-shaped body 172. Alignment of said reluctor member 184 within said reluctor space 177 in this manner decreases the magnetic permeance of said reluctor space 177 to a value lower than that of air (1.0). Similar operations and alignment are employed in variations of the third embodiment, utilizing the same yoke configuration.

One variation of the third embodiment is depicted in exploded side and cross-sectional views of FIG. 7B comprising a reluctor member 190 having a plurality of stacked disks 191 where each of said disks 191 is constructed of a plurality of concentric annular rings 192–196, respectively, with each of said concentric annular rings, 192–196, respectively, having a different transition temperature and being arranged so that the transition temperatures of said plurality of concentric annular rings 192–196, respectively, decrease in value going from an outermost annular ring 192 to an innermost annular ring 196 according to the formula:

$$T_n > T_{n-1}$$

in order to avoid both trapping magnetic flux as well as the attendant non-reversible effects of trapping magnetic flux. Constructing said reluctor member 190 in this manner allows for more precise temperature control characteristics. In operation, said reluctor member 190 is inserted within said reluctor space 177, with a left end 197 of said reluctor member 190 contacting said lower arm 182 of said "U"-shaped body 171 and a right end 198 of said reluctor member 190 contacting said lower arm 183 of said other "U"-shaped body 172.

Another variation of the third embodiment is illustrated in exploded side and cross-sectional views of FIG. 8, depicting a reluctor member 214 comprising a plurality of disks 215, with each of said disks 215 being composed of a plurality of parallel strips 222–229, respectively, with each of said plurality of parallel strips 222–229, respectively, having a different transition temperature, said parallel strip 229 being the highest transition temperature while said different transition temperatures of said other parallel strips decrease progressively so that said parallel strip 222 has the lowest transition temperature.

In the third embodiment of the present invention, temperature control on permeability may also be attained by employing a heating means, a cooling means or a combined heating and cooling means to reach a desired, specific reluctor member temperature. Said plurality of concentric annular rings 192–196,respectively, and said plurality of parallel strips 222–229, respectively, may also be constructed of different materials such as iron, a Type I superconductor, a Type II superconductor and a nonmagnetic material to attain desired temperature control results. In the parallel strip variation, even a Type II superconducting material could be selected to allow an even wider range of permeability values. The concentric annular ring and parallel strip variations require that said reluctor members ne composed of disks, while the third variation may employ pieces, disks or disk-shaped objects for said reluctor member.

The present invention encompasses a method of varying reluctance of a permanent magnetic circuit, which comprises the steps of producing a magnetic flux from a horseshoe-shaped magnetic flux source having a left arm, a right arm, a pair of permanent magnets and a working space, allowing said magnetic flux to flow in a magnetic flux path within said working space, said magnetic flux path having a given magnetic permeance and reluctance value, forming a pair of reluctor members from a plurality of Type II superconducting baffles, coaxially aligning said pair of reluctor members to occupy the same space as said magnetic flux path, allowing said reluctor members to reduce the magnetic flux flow in said magnetic flux path by the decrease of permeability in said magnetic flux path, which increases magnetic potential across said working space and results in increased magnetic flux in said working space. In this method, said plurality of Type II superconducting baffles may be shaped as disks, may be stacked and may be interspersed with a plurality of air gaps.

The present invention also encompasses a method of varying magnetic reluctance of a magnetic circuit, which comprises the steps of producing a magnetic flux from an iron yoke magnetic flux source, having a pair of opposing "U"-shaped bodies, thereby providing a pair of magnetic poles, a left lower arm, a right lower arm, a working space and a reluctor space between said left lower arm and said right lower arm, allowing said magnetic flux to flow in a magnetic flux path within said working space, said magnetic flux path having a given magnetic permeance and reluctance value, forming a reluctor member having a left end and a right end, aligning said reluctor member within said reluctor space, having said left end contacting said left arm and said right end contacting said right arm and allowing said reluctor member to vary the magnetic flux flow in said magnetic flux path by increasing said magnetic permeance of the magnetic flux above the permeance of air (1.0) and decreasing said reluctivity of the magnetic flux when said reluctor member is composed of a plurality of iron pieces.

In this method, said reluctor member may be formed from a plurality of Type I superconducting pieces to decrease permeability to a value lesser than that of air (1.0) but greater than 0, Type II superconducting pieces to decrease permeability to a value lesser than that of air (1.0) but greater than 0, Type II superconducting pieces interspersed between a plurality of iron pieces or Type II superconducting pieces to adjust permeability to a predetermined value all contacting a left gap and a right gap between said left and right arms, allowing said reluctor member to vary the magnetic flux flow in said magnetic flux path by decreasing permeability in said magnetic flux path, which increases said reluctivity of the magnetic flux.

This method also encompasses the step of connecting a plurality of reluctor members to a rotating means and allowing each of said reluctor members to be rotatably interposed within said reluctor space to vary the magnetic flux flow according to the composition of said reluctor member. In the method of varying magnetic reluctance of a magnetic circuit, as well as variations of this method, the reluctor member pieces may be disks or disk-shaped, and either as pieces or disks they may be stacked.

Additionally, the present invention encompasses method for varying magnetic reluctance of a magnetic circuit utilizing thermal controls on permeance, which comprises the steps of producing a magnetic flux from an iron yoke magnetic flux source, having a pair of opposing "U"-shaped bodies, thereby providing a pair of magnetic poles, a left lower arm, a right lower arm, a working space and a reluctor space between said left lower arm and said right lower arm. Allowing said magnetic flux to flow in a magnetic flux path within said working space, said magnetic flux path having a given magnetic permeance and reluctance value, forming a reluctor member having a left end and a right end from a plurality of Type I superconducting disks having different transition temperatures and a plurality of iron disks, where each of said plurality of Type I superconducting disks is composed of a plurality of concentric annular rings, each of said rings having a different pre-selected transition temperature, aligning said reluctor member within said reluctor space, having said left end contacting said left arm and said right end contacting said right arm and allowing said reluctor member to vary the magnetic flux flow in said magnetic flux path by decreasing permeability in said magnetic flux path, which increases said reluctivity of the magnetic flux. This method also encompasses forming said reluctor member from a plurality of Type I superconducting disks and a plurality of iron disks, where each of said plurality of Type I superconducting disks is composed of a plurality of parallel strips having different pre-selected transition temperatures, as well as a thermal control step which employs exposing a reluctor member to a heating means, a cooling means or a combined heating and cooling means to establish a specific reluctor member transition temperature before inserting said reluctor member in said reluctor space. In this method of varying magnetic reluctance of a magnetic circuit employing thermal controls, the concentric annular ring and parallel strip variations require constructing said reluctor members form disks, while in the heating means, cooling means and combined heating and cooling means variation said reluctor member may be formed from a plurality of Type I superconducting pieces, a plurality of iron pieces, a plurality of disks and a plurality of disk-shaped objects, all of which may be stacked.

Although the various embodiments of the present invention show cylindrical or bar magnets and working spaces, other geometries which exhibit like properties are possible. For example, the arms of the horseshoe magnet could be a square end magnet with a greater number of magnetic flux paths and exhibit the same properties.

It should be understood, of course, that the foregoing disclosure relates only to a small number of preferred embodiments and that numerous modifications or alterations may be made therein without departing from the spirit and scope of the inventions as set forth in the appended claims.

What I claim is:

1. A permanent magnetic reluctor structure, which comprises:

a horseshoe-shaped flux source producing a magnetic flux, said flux source having a cylindrical iron left arm opposing a cylindrical iron right arm and a pair of opposing permanent magnets;

said pair of opposing permanent magnets defining a working space between said left arm and said right arm;

said pair of opposing permanent magnets each having an upper portion and a lower portion;

said magnetic flux, having a given magnetic permeance and a given magnetic reluctivity, flows in a magnetic flux path within said working space;

a top reluctor member and a bottom reluctor member, each comprising a plurality of annular Type II superconducting baffles;

said top reluctor member and said bottom reluctor member each being disposed within said working space and coaxially aligned within said magnetic flux path;

said top reluctor member being disposed substantially parallel to said upper portions of the pair of opposing permanent magnets, and said bottom reluctor member disposed substantially parallel to said lower portions of the pair of opposing permanent magnets; and said top reluctor member and said bottom reluctor member reducing said magnetic permeance of the magnetic flux within said magnetic flux path below the permeance of air (1.0) but greater than 0 and increasing said reluctivity of the magnetic flux.

2. The permanent magnetic reluctor structure recited in claim 1, further comprising:

a longitudinal axis running through said pair of opposing permanent magnets and said working space; and said plurality of Type II superconducting baffles being stacked and disk-shaped.

3. The permanent magnetic reluctor structure recited in claim 1, further comprising interspersing said plurality of Type II superconducting baffles with a plurality of air gaps.

4. A permanent magnetic reluctor structure, comprising:

a horseshoe-shaped flux source producing a magnetic flux, said flux source having a cylindrical iron left arm opposing a cylindrical iron right arm and a pair of opposing permanent magnets;

said pair of opposing permanent magnets defining a working space between said left arm and said right arm;

said pair of opposing permanent magnets each having an upper portion and a lower portion;

said magnetic flux, having a given magnetic permeance and a given magnetic reluctivity, flows in a magnetic flux path within said working space;

said top reluctor member and said bottom reluctor member being constructed from a plurality of iron baffles being stacked;

said top reluctor member and said bottom reluctor member each being disposed within said working space and coaxial aligned within said magnetic flux path;

said top reluctor member being disposed substantially parallel to said upper portions of the pair of opposing permanent magnets, and said bottom reluctor member disposed substantially parallel to said lower portions of the pair of opposing permanent magnets; and said top reluctor member and said bottom reluctor member reducing said magnetic permeance of the magnetic flux within said magnetic flux path below the permeance of air 1.0 but greater than 0 and increasing said reluctivity of the magnetic flux.

5. The permanent magnetic reluctor structure recited in claim 4, wherein said plurality of iron baffles are shaped as disks.

6. The permanent magnetic reluctor structure recited in claim 5, further comprising said plurality of iron baffles being interspersed with a plurality of air gaps.

7. A method for varying magnetic reluctance of a permanent magnetic circuit, comprising the steps of:

producing a magnetic flux from a horseshoe-shaped flux source, said flux source having a cylindrical iron left arm opposing a cylindrical iron right arm and a pair of opposing permanent magnets, said pair of opposing permanent magnets each having an upper portion and a lower portion;

aligning said pair of opposing permanent magnets to define a working space between said left arm and said right arm;

allowing said magnetic flux, having a given magnetic permeance and a given magnetic reluctivity, to flow in a magnetic flux path within said working space;

forming a top reluctor member and a bottom reluctor member, each comprising a plurality of annular Type II superconducting baffles;

aligning said top reluctor member and said bottom reluctor member within said working space to be coaxially aligned within said magnetic flux path;

disposing said top reluctor member substantially parallel to said upper portions of the pair of opposing permanent magnets;

disposing said bottom reluctor member substantially parallel to said lower portions of the pair of opposing permanent magnets; and allowing said top reluctor member and said bottom reluctor member to reduce said magnetic permeance of the magnetic flux within said magnetic flux path below the permeance of air (1.0) but greater than 0 and increase said reluctivity of the magnetic flux.

8. The method for varying magnetic reluctance of a permanent magnetic circuit recited in claim 7, further comprising the steps of:

locating a longitudinal axis running through said pair of opposing permanent magnets and said working space;

shaping said plurality of Type II superconducting baffles into disks; and stacking said plurality of Type II superconducting baffles.

9. The method for varying magnetic reluctance of a permanent magnetic circuit recited in claim 7, further comprising the step of interspersing said plurality of Type II superconducting baffles with a plurality of air gaps.

10. A method for varying magnetic reluctance of a permanent magnetic circuit, comprising the steps of:

producing a magnetic flux from a horseshoe-shaped flux source, said flux source having a cylindrical iron left arm opposing a cylindrical iron right arm and a pair of opposing permanent magnets, said pair of opposing permanent magnets each having an upper portion and a lower portion;

aligning said pair of opposing permanent magnets to define a working space between said left arm and said right arm;

allowing said magnetic flux, having a given magnetic permeance and a given magnetic reluctivity, to flow in a magnetic flux path within said working space;

forming said top reluctor member and said bottom reluctor member from a plurality of iron baffles;

stacking said plurality of iron baffles;

aligning said top reluctor member and said bottom reluctor member within said working space to be coaxially aligned within said magnetic flux path;

disposing said top reluctor member substantially parallel to said upper portions of the pair of opposing permanent magnets;

disposing said bottom reluctor member substantially parallel to said lower portions of the pair of opposing permanent magnets; and allowing said top reluctor member and said bottom reluctor member to reduce said magnetic permeance of the magnetic flux within said magnetic flux path below the permeance of air (1.0) but greater than 0 and increase said reluctivity of the magnetic flux.

11. The method for varying magnetic reluctance of a permanent magnetic circuit recited in claim 10, further comprising forming said plurality of iron baffles as disks.

12. The method for varying magnetic reluctance of a permanent magnetic circuit recited in claim 11, further comprising the step of alternating said plurality of iron baffles with a plurality of air gaps.

* * * * *